US006583763B2

(12) United States Patent
Judd

(10) Patent No.: US 6,583,763 B2
(45) **Date of Patent: *Jun. 24, 2003**

(54) ANTENNA STRUCTURE AND INSTALLATION

(75) Inventor: Mano D. Judd, Rockwall, TX (US)

(73) Assignee: Andrew Corporation, Orland Park, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/299,850

(22) Filed: Apr. 26, 1999

(65) Prior Publication Data

US 2003/0071761 A1 Apr. 17, 2003

(51) Int. Cl.[7] .................................................. H04B 7/08
(52) U.S. Cl. ........................ 343/701; 343/890; 343/874
(58) Field of Search ................................ 343/701, 824, 343/843, 874, 890; 359/121; 455/450, 562

(56) References Cited

U.S. PATENT DOCUMENTS 4,124,852 A 11/1978 Steudel ....................... 343/854

(List continued on next page.)

FOREIGN PATENT DOCUMENTS

| | | | |
|---|---|---|---|
| EP | 0 551 556 A1 | 7/1993 | |
| EP | 0 447 218 B1 | 5/1996 | H01Q/5/00 |
| EP | 0 994 567 A2 | 4/2000 | |
| EP | 0 713 261 B1 | 2/2002 | H01Q/3/26 |
| GB | 2286749 A | 8/1996 | H04B/7/08 |
| JP | 08-102618 | 4/1996 | |
| JP | 11-330838 | 11/1999 | |
| WO | WO95/26116 | 9/1995 | H04Q/7/36 |
| WO | WO 95/34102 | 12/1995 | H01Q/1/38 |
| WO | WO 98/09372 | 3/1998 | H03F/1/32 |
| WO | WO 98/11626 | 3/1998 | H01Q/23/00 |
| WO | WO 98/50981 | 11/1998 | H01Q/3/40 |
| WO | WO 99/26317 | 5/1999 | H01Q/21/30 |
| WO | WO 00/31824 | 6/2000 | H01Q/5/00 |

OTHER PUBLICATIONS

Howatt, F., "Cell Like Performance Uisng the Remotely Controlled Cellular Transmitter", *Gateway to New Concepts in Vehicular Technology*, San Francisco, May 1–3, 1989, Vehicular Technology conference, New York, IEEE, vol. 2, Conf. 39, (May 1, 1989), pp. 535–541, XP000076080.

(List continued on next page.)

*Primary Examiner*—Don Wong
*Assistant Examiner*—James Clinger
(74) *Attorney, Agent, or Firm*—Wood, Herron & Evans, L.L.P.

(57) ABSTRACT

A distributed antenna array includes a plurality of antenna elements and a plurality of power amplifiers, each power amplifier being operatively coupled with one of the antenna elements and mounted closely adjacent to the associated antenna element, such that no appreciable power loss occurs between the power amplifier and the associated antenna element. Each power amplifier is a relatively low power, relatively low cost per watt linear power amplifier chip. The antenna array may be used in various installations, including cellular, PCS, MMDS, LMDS and in-building communication systems such as LANS or WLANS.

13 Claims, 8 Drawing Sheets

U.S. PATENT DOCUMENTS

| | | | | | |
|---|---|---|---|---|---|
| 4,246,585 | A | | 1/1981 | Mailloux | 343/854 |
| 4,360,813 | A | | 11/1982 | Fitzsimmons | 343/100 |
| 4,566,013 | A | | 1/1986 | Steinberg et al. | 343/372 |
| 4,607,389 | A | * | 8/1986 | Halgrimson | 455/11 |
| 4,614,947 | A | | 9/1986 | Rammos | 343/778 |
| 4,689,631 | A | | 8/1987 | Gans et al. | 343/781 |
| 4,825,172 | A | | 4/1989 | Thompson | 330/124 R |
| 4,849,763 | A | | 7/1989 | DuFort | 342/372 |
| 4,890,110 | A | | 12/1989 | Kuwahara | 342/35 |
| 4,994,813 | A | | 2/1991 | Shiramatsu et al. | 342/360 |
| 5,034,752 | A | | 7/1991 | Pourailly et al. | 342/373 |
| 5,038,150 | A | | 8/1991 | Bains | 342/188 |
| 5,061,939 | A | | 10/1991 | Nakase | 343/700 |
| 5,230,080 | A | | 7/1993 | Fabre et al. | 455/15 |
| 5,247,310 | A | | 9/1993 | Waters | 342/368 |
| 5,248,980 | A | | 9/1993 | Raguenet | 342/354 |
| 5,270,721 | A | | 12/1993 | Tsukamoto et al. | 343/700 |
| 5,280,297 | A | | 1/1994 | Profera, Jr. | 343/754 |
| 5,327,150 | A | | 7/1994 | Cherrette | 343/771 |
| 5,355,143 | A | | 10/1994 | Zurcher et al. | 343/700 |
| 5,379,455 | A | | 1/1995 | Koschek | 455/273 |
| 5,412,414 | A | | 5/1995 | Ast et al. | 342/174 |
| 5,437,052 | A | | 7/1995 | Hemmie et al. | 455/5.1 |
| 5,457,557 | A | * | 10/1995 | Zarem et al. | 359/121 |
| 5,513,176 | A | * | 4/1996 | Dean et al. | 370/18 |
| 5,548,813 | A | | 8/1996 | Charas et al. | 455/33.3 |
| 5,554,865 | A | * | 9/1996 | Larson | 257/275 |
| 5,568,160 | A | | 10/1996 | Collins | 343/778 |
| 5,596,329 | A | | 1/1997 | Searle et al. | 342/374 |
| 5,604,462 | A | | 2/1997 | Gans et al. | 330/124 R |
| 5,610,510 | A | * | 3/1997 | Boone et al. | 324/95 |
| 5,619,210 | A | | 4/1997 | Dent | 342/352 |
| 5,623,269 | A | | 4/1997 | Hirshfield et al. | 342/354 |
| 5,644,622 | A | | 7/1997 | Russell et al. | 455/422 |
| 5,646,631 | A | | 7/1997 | Arntz | 342/373 |
| 5,657,374 | A | | 8/1997 | Russell et al. | 370/328 |
| 5,659,322 | A | | 8/1997 | Caille | 342/188 |
| 5,710,804 | A | | 1/1998 | Bhame et al. | 379/58 |
| 5,714,957 | A | | 2/1998 | Searle et al. | 342/374 |
| 5,724,666 | A | | 3/1998 | Dent | 455/562 |
| 5,751,250 | A | | 5/1998 | Arntz | 342/373 |
| 5,754,139 | A | | 5/1998 | Turcotte et al. | 342/373 |
| 5,758,287 | A | | 5/1998 | Lee et al. | 455/450 |
| 5,770,970 | A | | 6/1998 | Ikeda | 330/286 |
| 5,771,017 | A | | 6/1998 | Dean et al. | 342/374 |
| 5,784,031 | A | * | 7/1998 | Weiss et al. | 342/373 |
| 5,802,173 | A | | 9/1998 | Hamilton -Piercy et al. | 379/56.2 |
| 5,809,395 | A | | 9/1998 | Hamilton-Piercy et al. | 455/4.1 |
| 5,825,762 | A | | 10/1998 | Kamin, Jr. et al. | 370/335 |
| 5,832,389 | A | | 11/1998 | Dent | 455/562 |
| 5,854,611 | A | | 12/1998 | Gans et al. | 342/373 |
| 5,856,804 | A | | 1/1999 | Turcotte et al. | 342/371 |
| 5,862,459 | A | | 1/1999 | Charas | 455/114 |
| 5,878,345 | A | * | 3/1999 | Ray et al. | 455/431 |
| 5,896,104 | A | | 4/1999 | Komatsu et al. | 342/175 |
| 5,933,113 | A | | 8/1999 | Newberg et al. | 342/375 |
| 5,936,577 | A | | 8/1999 | Shoki et al. | 352/373 |
| 5,949,376 | A | | 9/1999 | McDonald et al. | 343/700 MS |
| 5,966,094 | A | | 10/1999 | Ward et al. | 342/373 |
| 5,987,335 | A | | 11/1999 | Knoedl, Jr. et al. | 455/561 |
| 6,008,763 | A | | 12/1999 | Nystrom et al. | 343/700 |
| 6,016,123 | A | * | 1/2000 | Barton et al. | 342/373 |
| 6,018,643 | A | | 1/2000 | Golemon et al. | 455/63 |
| 6,020,848 | A | * | 2/2000 | Wallace et al. | 342/362 |
| 6,037,903 | A | | 3/2000 | Lange et al. | 343/700 |
| 6,043,790 | A | | 3/2000 | Derneryd et al. | 343/853 |
| 6,047,199 | A | | 4/2000 | DeMarco | 455/572 |
| 6,072,434 | A | | 6/2000 | Papatheodorou | 343/700 |
| 6,091,360 | A | | 7/2000 | Reits | 342/368 |
| 6,094,165 | A | | 7/2000 | Smith | 342/373 |
| 6,104,935 | A | | 8/2000 | Smith et al. | 455/562 |
| 6,140,976 | A | | 10/2000 | Locke et al. | 343/853 |
| 6,144,652 | A | | 11/2000 | Avidor et al. | 370/339 |
| 6,157,343 | A | | 12/2000 | Andersson et al. | 342/371 |
| 6,160,514 | A | | 12/2000 | Judd | 343/700 |
| 6,222,503 | B1 | | 4/2001 | Gietema et al. | 343/890 |
| 6,233,434 | B1 | | 5/2001 | Takei | 455/103 |
| 6,233,466 | B1 | | 5/2001 | Wong et al. | 455/562 |
| 6,240,274 | B1 | * | 5/2001 | Izadpanah | 455/39 |
| 6,269,255 | B1 | | 7/2001 | Waylett | 455/562 |
| 6,377,558 | B1 | * | 4/2002 | Dent | 370/321 |

OTHER PUBLICATIONS

Shibutani, Makoto et al., "Optical Fiber Feeder for Microcellular Mobile Communicaton Systems (H–015)", *IEEE Journal on Selected Areas in Communications*, IEEE Inc., New York, NY, vol. 11, No. 7, (Sep. 1, 1993), pp. 1118–1126, XP000400021, ISSN: 0733–8716.

Levine, E., Malamud, G., Shtrikman, S., and Treves, D., "A study of Microstrip Array Antennas with the Feed Network," IEEE Trans. Antenna Propagation, vol. 37, No. 4, Apr. 1989, pp. 426–434.

Herd, J., "Modelling of Wideband Proximity Microstrip Array Elements," Electronic Letters, vol. 26, No. 16, Aug. 1990, pp. 1282–1284.

Hall, P.S., and Hall, C.M., "Coplanar Corporate Feed Effects in Microstrip Patch Array Design," Proc. IEEE, vol. 135, pt. H, Jun. 1988, pp. 180–186.

Zurcher, J.F., "The SSFIP: A Global Concept for High Performance Broadband Planar Antennas," Electronic Letters, vol. 24, No. 23, Nov. 1988, pp. 1433–1435.

Zurcher, J.F. and Gardiol, F., Broadband Patch Antennas, Artech House, 1995, pp. 45–60.

Song, H.J. and Bialkowski, M.E., "A Multilayer Microstrip Patch Antenna Subarray Design using CAD," Microwave Journal., Mar. 1997, pp. 22–34, 8 pages.

Song, H.J. and Bialkowski, M.E., "Ku–Band 16 x 16 Planar Array with Aperture–Coupled Microstrip–Patch Elements," IEEE Antennas and Propagation Magazine, vol. 40, No. 5, Oct. 1998, pp. 25–29.

* cited by examiner

ANTENNA STRUCTURE AND INSTALLATION

BACKGROUND OF THE INVENTION

This invention is directed to a novel antenna structure including an antenna array having a power amplifier chip operatively coupled to, and in close proximity to each antenna element in the antenna array.

In communications equipment such as cellular and personal communications service (PCS), as well as multi-channel multi-point distribution systems (MMDS) and local multi-point distribution systems (LMDS) it has been conventional to receive and retransmit signals from users or subscribers utilizing antennas mounted at the tops of towers or other structures. Other communications systems such as wireless local loop (WLL), specialized mobile radio (SMR) and wireless local area network (WLAN) have signal transmission infrastructure for receiving and transmitting communications between system users or subscribers which may also utilize various forms of antennas and transceivers.

All of these communications systems require amplification of the signals being transmitted and received by the antennas. For this purpose, it has heretofore been the practice to use a conventional linear power amplifier system, wherein the typical expense of providing the necessary amplification is typically between U.S. $100 and U.S. $300 per watt in 1998 U.S. dollars. In the case of communications systems employing towers or other structures, much of the infrastructure is often placed at the bottom of the tower or other structure with relatively long coaxial cables connecting with antenna elements mounted on the tower. The power losses experienced in the cables may necessitate some increase in the power amplification which is typically provided at the ground level infrastructure or base station, thus further increasing expense at the foregoing typical costs per unit or cost per watt.

Moreover, conventional power amplification systems of this type generally require considerable additional circuitry to achieve linearity or linear performance of the communications system. For example, in a conventional linear amplifier system, the linearity of the total system may be enhanced by adding feedback circuits and predistortion circuitry to compensate for the nonlinearities at the amplifier chip level, to increase the effective linearity of the amplifier system. As systems are driven to higher power levels, relatively complex circuitry must be devised and implemented to compensate for decreasing linearity as the output power increases.

Output power levels for infrastructure (base station) applications in many of the foregoing communications systems is typically in excess of ten watts, and often up to hundreds of watts which results in a relatively high effective isotropic power requirement (EIRP). For example, for a typical base station with a twenty watt power output (at ground level), the power delivered to the antenna, minus cable losses, is around ten watts. In this case, half of the power has been consumed in cable loss/heat. Such systems require complex linear amplifier components cascaded into high power circuits to achieve the required linearity at the higher output power. Typically, for such high power systems or amplifiers, additional high power combiners must be used.

All of this additional circuitry to achieve linearity of the overall system, which is required for relatively high output power systems, results in the aforementioned cost per unit/watt (between $100 and $300).

The present invention proposes distributing the power across multiple antenna (array) elements, to achieve a lower power level per antenna element and utilize power amplifier technology at a much lower cost level (per unit/per watt).

SUMMARY OF THE INVENTION

In accordance with one aspect of the invention, power amplifier chips of relatively low power and low cost per watt are utilized in a relatively low power and linear region in an infrastructure application. In order to utilize such relatively low power, low cost per watt chips, the present invention proposes use of an antenna array in which one relatively low power amplifier chip is utilized in connection with each antenna element of the array to achieve the desired overall output power of the array.

Accordingly, a relatively low power amplifier chip typically used for remote and terminal equipment (e.g., handset or user/subscriber equipment) applications may be used for infrastructure (e.g., base station) applications. In accordance with the invention, the need for distortion correction circuitry and other relatively expensive feedback circuits and the like used for linear performance in relatively high power systems is eliminated. The linear performance is achieved by using the relatively low power chips within their linear output range. That is, the invention proposes to avoid overdriving the chips or requiring operation close to saturation level, so as to avoid the requirement for additional expensive and complex circuitry to compensate for reduced linearity. The power amplifier chips used in the present invention in the linear range typically have a low output power of one watt or below. Moreover, the invention proposes installing a power amplifier chip of this type at the feed point of each element of a multi-element antenna array. Thus, the output power of the antenna system as a whole may be multiplied by the number of elements utilized in the array while maintaining linearity.

Furthermore, the present invention does not require relatively expensive high power combiners, since the signals are combined in free space (at the far field) at the remote or terminal location via electromagnetic waves. Thus, the proposed system uses low power combining avoiding otherwise conventional combining costs. Also, in tower applications, the system of the invention eliminates the power loss problems associated with the relatively long cable which conventionally connects the amplifiers in the base station equipment with the tower-mounted antenna equipment, i.e., by eliminating the usual concerns with power loss in the cable and contributing to a lesser power requirement at the antenna elements. Thus, by placing the amplifiers close to the antenna elements, amplification is accomplished after cable or other transmission line losses usually experienced in such systems. This may further decrease the need for special low loss cables, thus further reducing overall system costs.

DETAILED DESCRIPTION OF THE ILLUSTRATED EMBODIMENT

Figure 1:
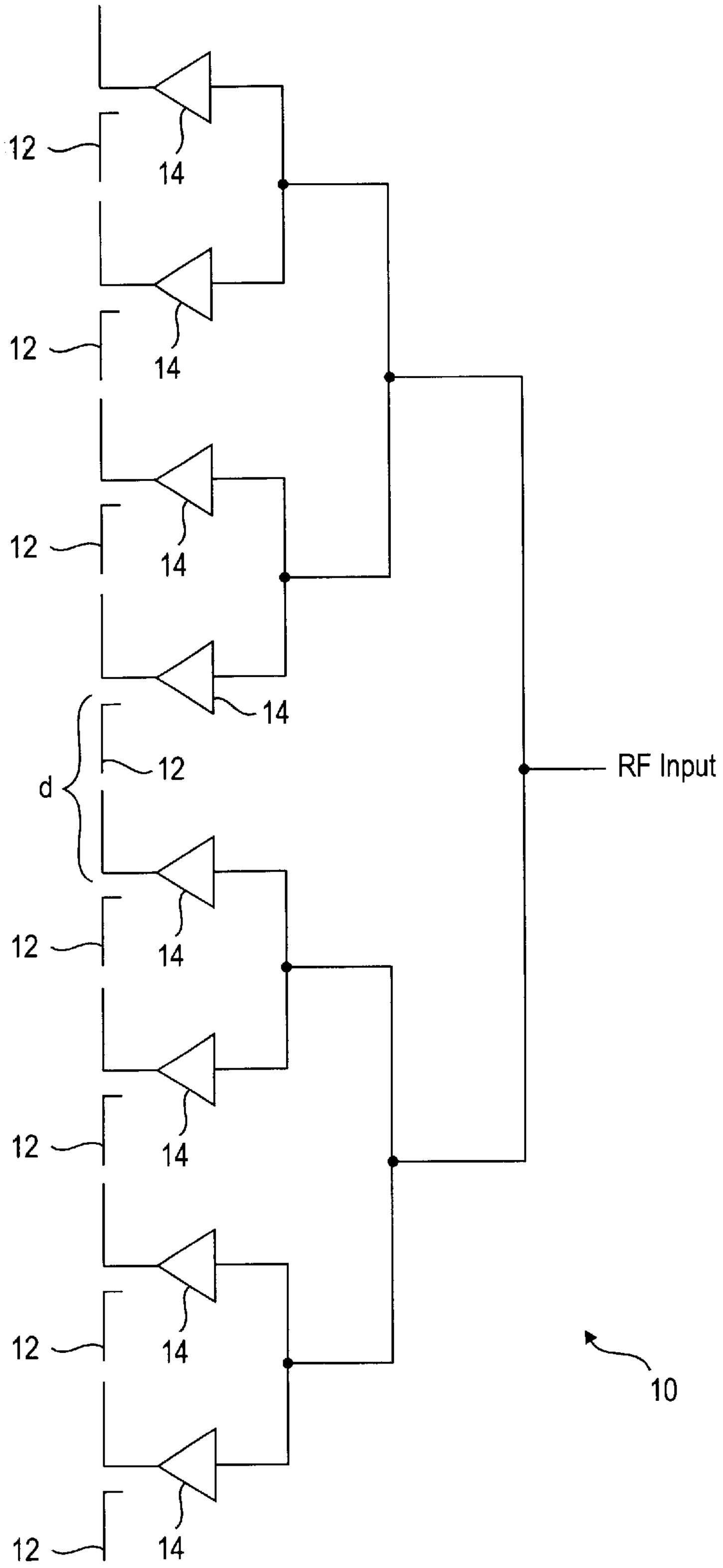
FIG. 1 is a simplified schematic of an antenna array utilizing power amplifier chips/modules in accordance with one form of the invention.
Figure 2:
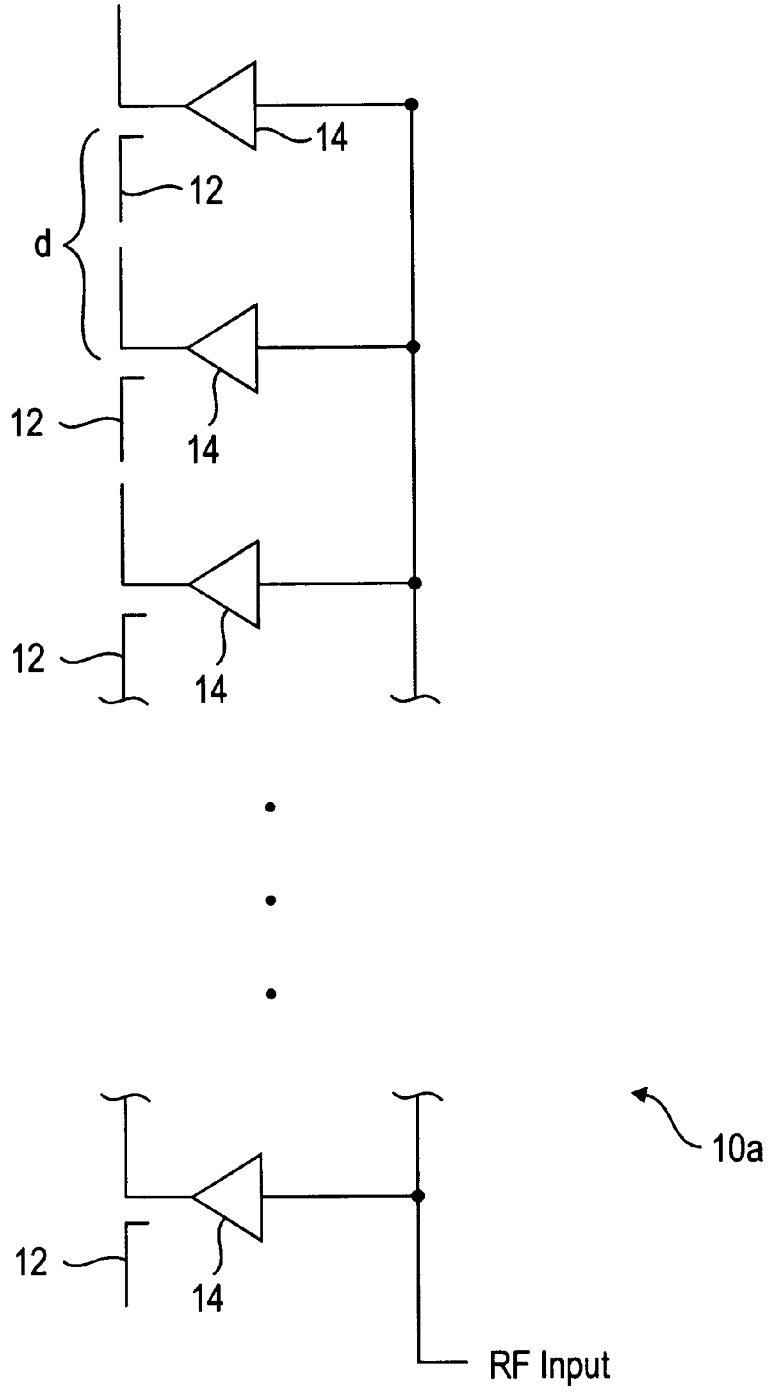
FIG. 2 is a schematic similar to FIG. 1 in showing an alternate embodiment.

Referring now to the drawings, and initially to FIGS. 1 and 2, there are shown two examples of a multiple antenna element antenna array 10, 10*a* in accordance with the invention. The antenna array 10, 10*a* of FIGS. 1 and 2 differ in the configuration of the feed structure utilized, FIG. 1 illustrating a parallel corporate feed structure and FIG. 2 illustrating a series corporate feed structure. In other respects, the two antenna arrays 10, 10*a* are substantially identical. Each of the arrays 10, 10*a* includes a plurality of antenna elements 12, which may comprise monopole, dipole or microstrip/patch antenna elements. Other types of antenna elements may be utilized to form the arrays 10, 10*a* without departing from the invention.

In accordance with one aspect of the invention, an amplifier element 14 is operatively coupled to the feed of each antenna element 12 and is mounted in close proximity to the associated antenna element 12. In one embodiment, the amplifier elements 14 are mounted sufficiently close to each antenna element so that no appreciable losses will occur between the amplifier output and the input of the antenna element, as might be the case if the amplifiers were coupled to the antenna elements by a length of cable or the like. For example, the power amplifiers 14 may be located at the feed point of each antenna element. In one embodiment, the amplifier elements 14 comprise relatively low power, linear integrated circuit chip components, such as monolithic microwave integrated circuit (MMIC) chips. These chips may comprise chips made by the gallium arsenide (GaAs) heterojunction transistor manufacturing process. However, silicon process manufacturing or CMOS process manufacturing might also be utilized to form these chips.

Some examples of MMIC power amplifier chips are as follows:

1. RF Microdevices PCS linear power amplifier RF 2125P, RF 2125, RF 2126 or RF 2146, RF Micro Devices, Inc., 7625 Thomdike Road, Greensboro, N.C. 27409, or 7341-D W. Friendly Ave., Greensboro, N.C. 27410;
2. Pacific Monolithics PM 2112 single supply RF IC power amplifier, Pacific Monolithics, Inc., 1308 Moffett Park Drive, Sunnyvale, Calif.;
3. Siemens CGY191, CGY180 or CGY181, GaAs MMIC dual mode power amplifier, Siemens AG, 1301 Avenue of the Americas, New York, N.Y.;
4. Stanford Microdevices SMM-208, SMM-210 or SXT-124, Stanford Microdevices, 522 Almanor Avenue, Sunnyvale, Calif.;
5. Motorola MRFIC 1817 or MRFIC 1818, Motorola Inc., 505 Barton Springs Road, Austin, Tex.;
6. Hewlett Packard HPMX-3003, Hewlett Packard Inc., 933 East Campbell Road, Richardson, Tex.;
7. Anadigics AWT1922, Anadigics, 35 Technology Drive, Warren, N.J. 07059;
8. SEI Ltd. P0501913H, 1, Taya-cho, Sakae-ku, Yokohama, Japan; and
9. Celeritek CFK2062-P3, CCS1930 or CFK2162-P3, Celeritek, 3236 Scott Blvd., Santa Clara, Calif. 95054.

In the antenna arrays of FIGS. 1 and 2, array phasing may be adjusted by selecting or specifying the element-to-element spacing (d) and/or varying the line length in the corporate feed. The array amplitude coefficient adjustment may be accomplished through the use of attenuators before or after the power amplifiers 14, as shown in FIG. 3.

Figure 3:
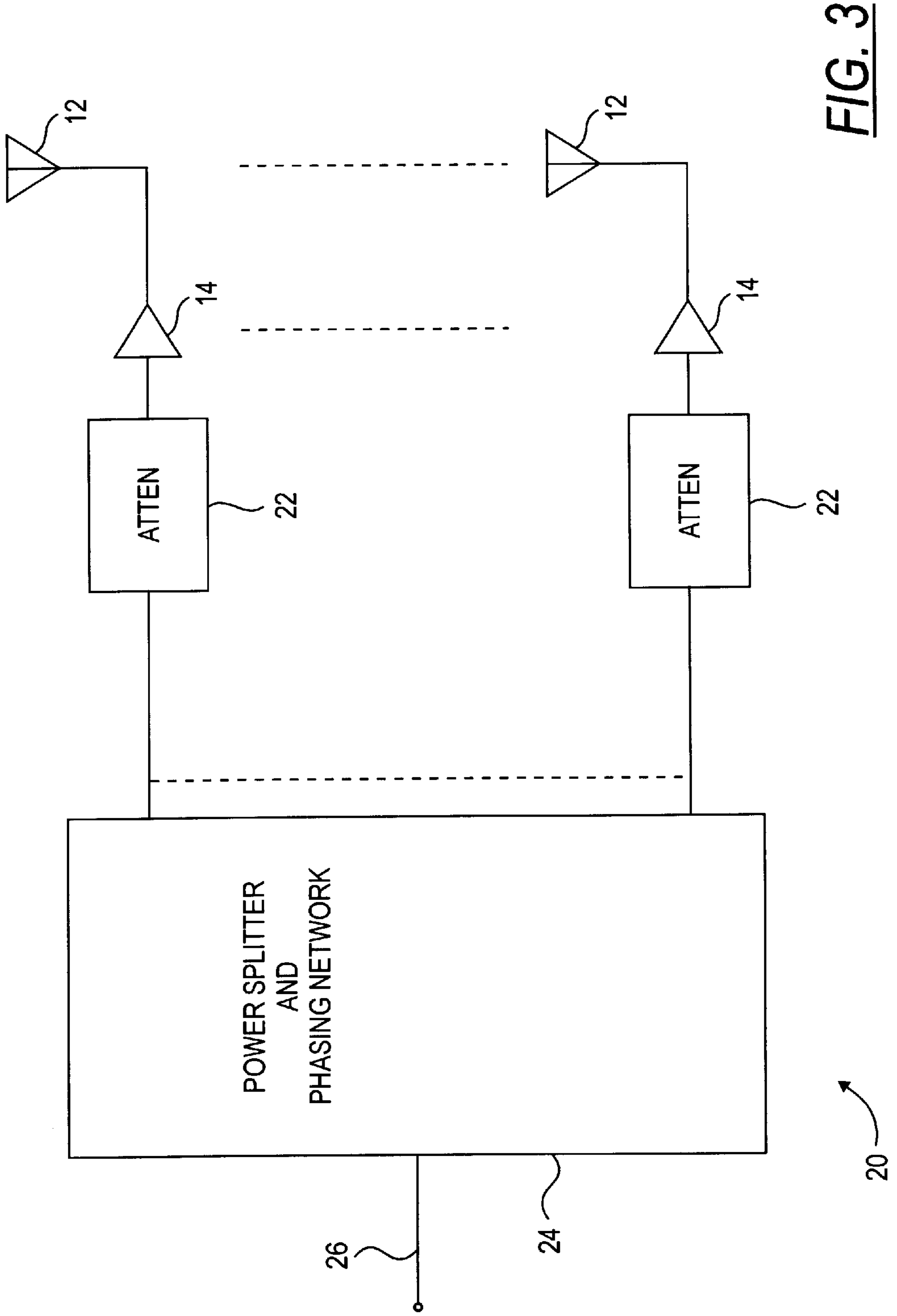
FIG. 3 is a block diagram of an antenna assembly or system in accordance with one aspect of the invention.

Referring now to FIG. 3, an antenna system in accordance with the invention and utilizing an antenna array of the type shown in either FIG. 1 or FIG. 2 is designated generally by the reference numeral 20. The antenna system 20 includes a plurality of antenna elements 12 and associated power amplifier chips 14 as described above in connection with FIGS. 1 and 2. Also operatively coupled in series circuit with the power amplifiers 14 are suitable attenuator circuits 22. The attenuator circuits 22 may be interposed either before or after the power amplifier 14; however, FIG. 3 illustrates them at the input to each power amplifier 14. A power splitter and phasing network 24 feeds all of the power amplifiers 14 and their associated series connected attenuator circuits 22. An RF input 26 feeds into this power splitter and phasing network 24.

Figure 4:
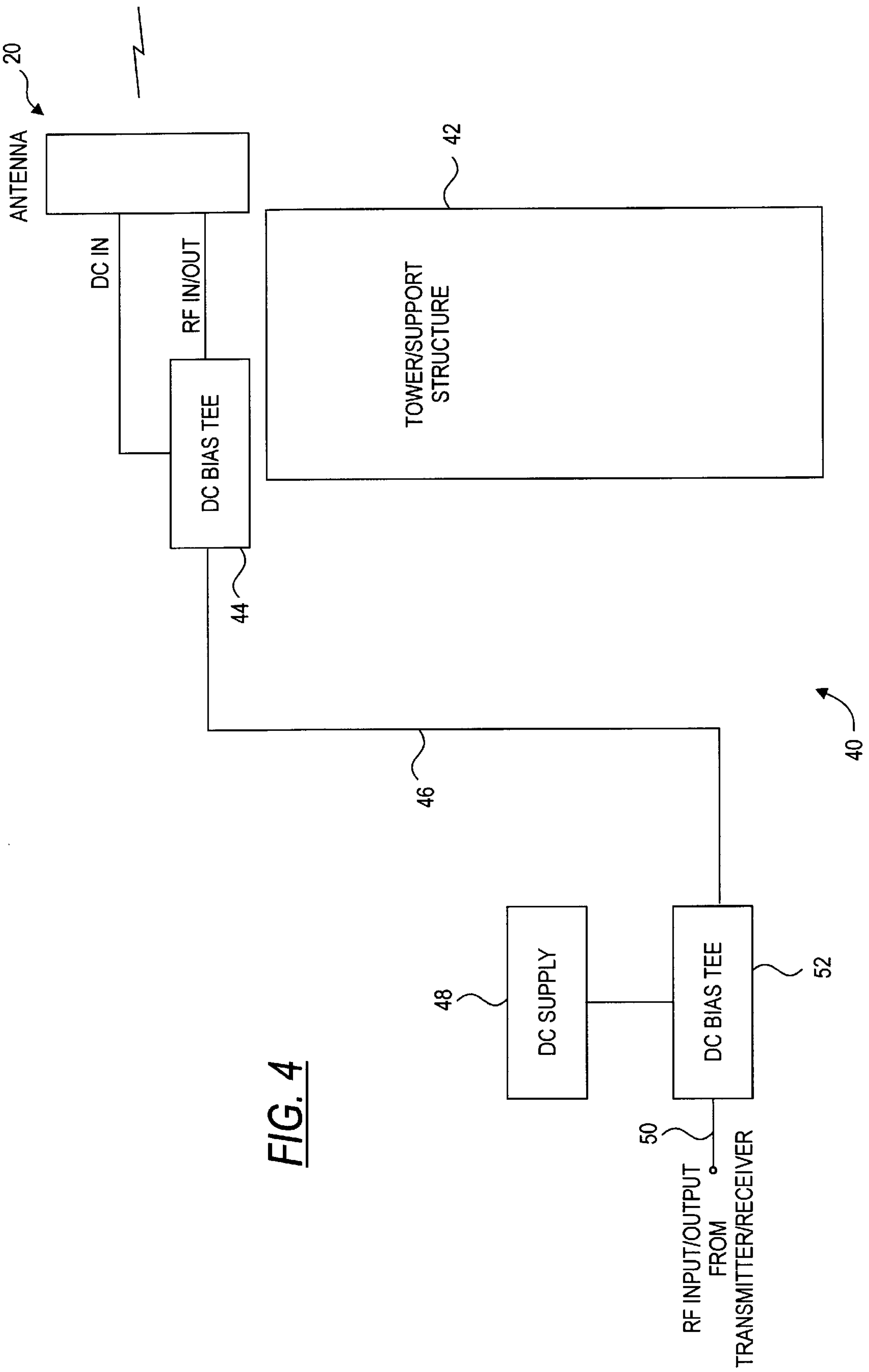
FIG. 4 is a block diagram of a communications system base station utilizing a tower or other support structure, and employing an antenna system in accordance with the invention.

Referring to FIG. 4, an antenna system installation utilizing the antenna system 20 of FIG. 3 is designated generally by the reference numeral 40. FIG. 4 illustrates a base station or infrastructure configuration for a communications system such as a cellular system, a personal communications system PCS or a multi-channel multipoint distribution system (MMDS). The antenna structure or assembly 20 of FIG. 3 is mounted at the top of a tower or other support structure 42. A DC bias tee 44 separates signals received via a coaxial cable 46 into DC power and RF components, and conversely receives incoming RF signals from the antenna system 20 and delivers the same to the coaxial line or cable 46 which couples the tower-mounted components to ground based components. The ground based components may include a DC power supply 48 and an RF input/output 50 from a transmitter/receiver (not shown) which may be located at a remote equipment location, and hence is not shown in FIG. 4. A similar DC bias tee 52 receives the DC supply and RF input and couples them to the coaxial line 46, and conversely delivers signals received from the antenna structure 20 to the RF input/output 50.

Figure 5:
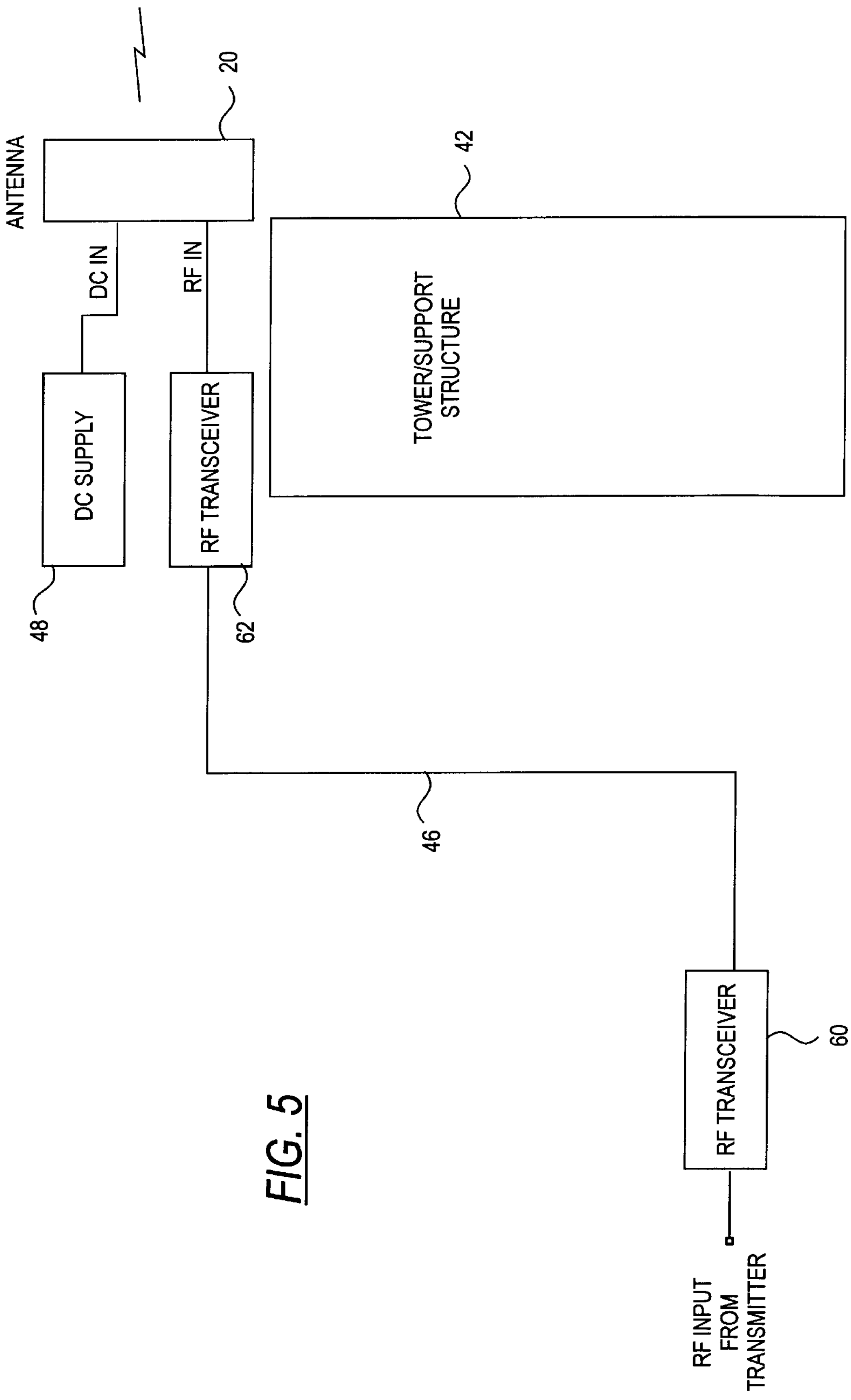
FIG. 5 is a block diagram of a base station for a local multipoint distribution system (LMDS) employing the antenna system of the invention.

FIG. 5 illustrates a local multipoint distribution system (LMDS) employing the antenna structure or system 20 as described above. In similar fashion to the installation of FIG. 4, the installation of FIG. 5 mounts the antenna system 20 atop a tower/support structure 42. Also, a coaxial cable 46, for example, an RF coaxial cable for carrying RF transmissions, runs between the top of the tower/support structure and ground based equipment. The ground based equipment may include an RF transceiver 60 which has an RF input from a transmitter. Another similar RF transceiver 62 is located at the top of the tower and exchanges RF signals with the antenna structure or system 20. A power supply such as a DC supply 48 is also provided for the antenna system 20, and is located at the top of the tower 42 in the embodiment shown in FIG. 5.

Figure 6:
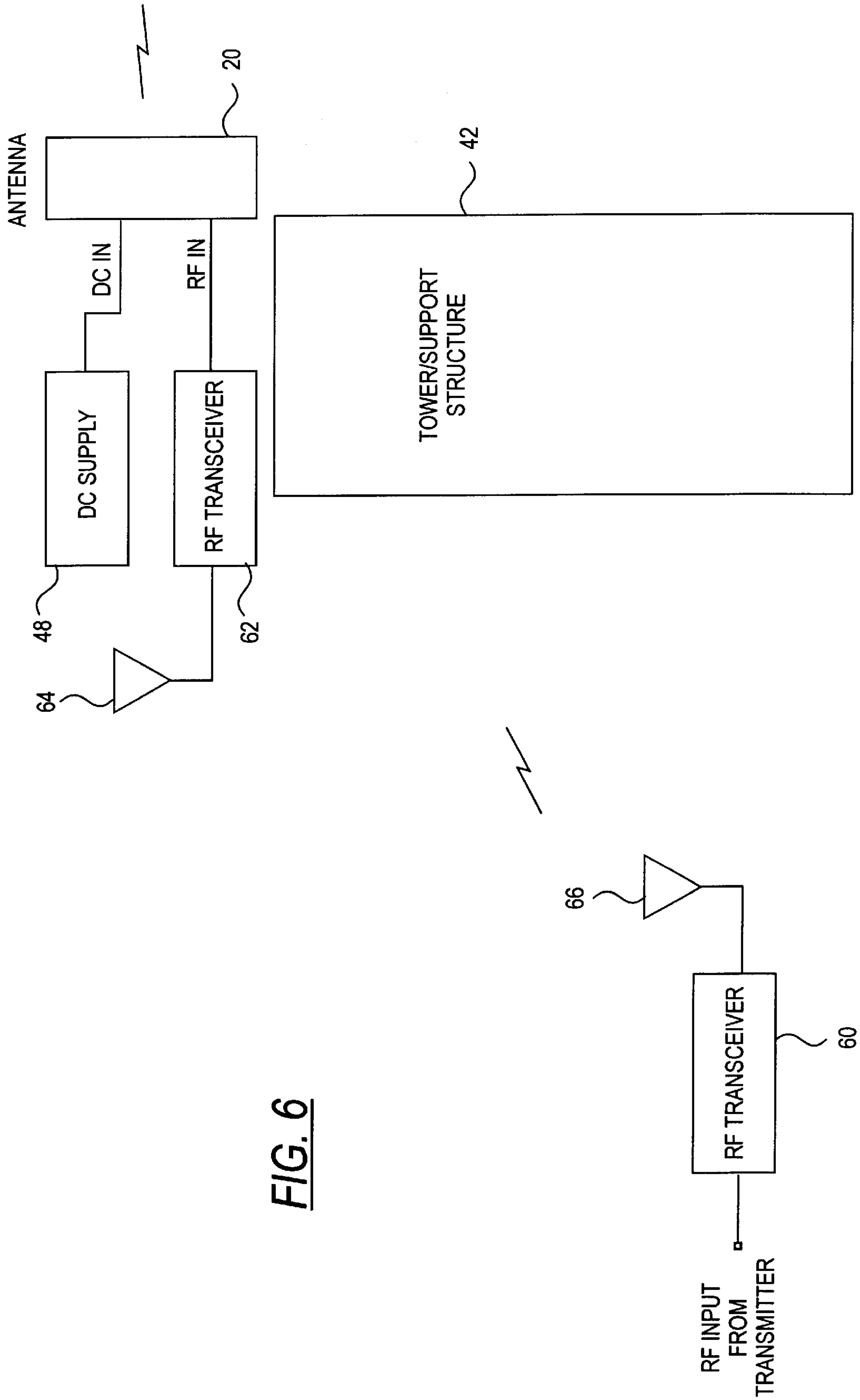
FIG. 6 is a block diagram of a wireless LAN system employing an antenna system in accordance with the invention.

FIG. 6 illustrates a WLAN (wireless local area network installation) which also mounts an antenna structure or system 20 of the type described above at the top of a tower/support structure 42. In similar fashion to the installation of FIG. 5, an RF transceiver and power supply such as a DC supply 48 are also located at the top of the tower/support structure and are operatively coupled with the antenna system 20. A second or remote RF transceiver 60 may be located adjacent the base of the tower or otherwise within range of a wireless link which links the transceivers 60 and 62, by use of respective transceiver antenna elements 64 and 66 as illustrated in FIG. 6.

Figure 7:
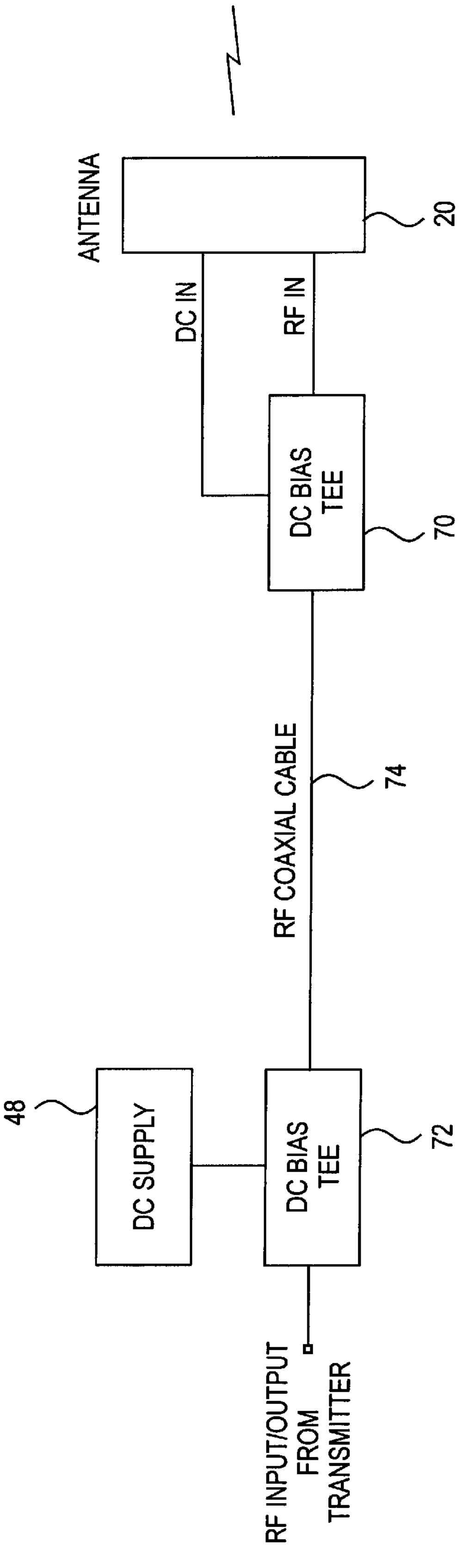
FIGS. 7 and 8 are block diagrams of two types of in-building communications base stations utilizing an antenna system in accordance with the invention.
Figure 8:
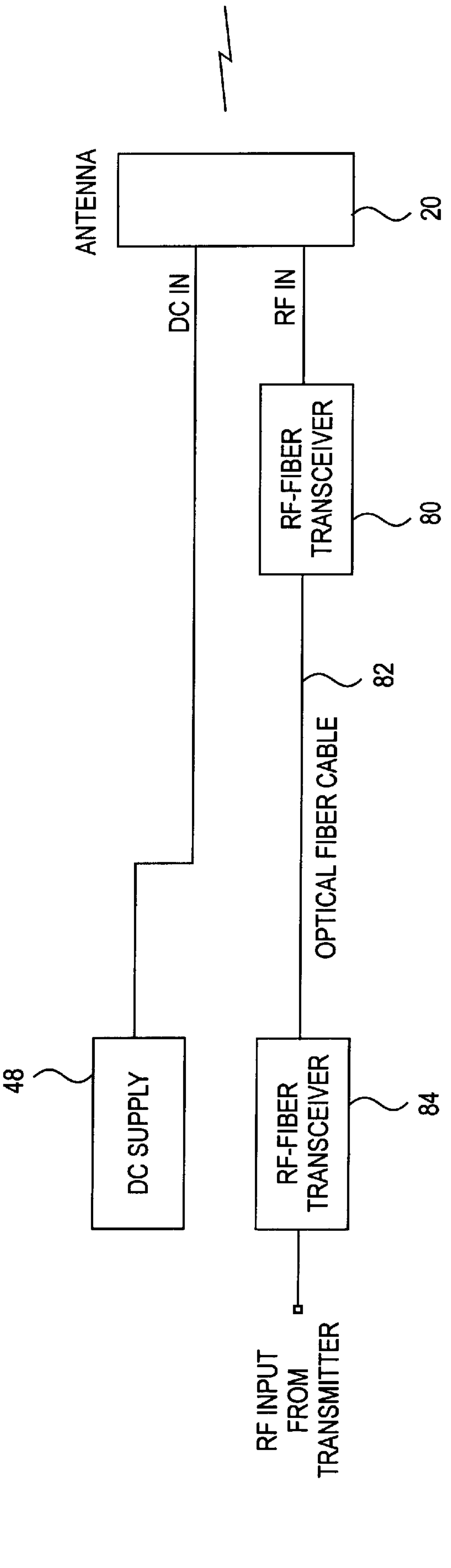

FIGS. 7 and 8 illustrate examples of use of the antenna structure or system 20 of the invention in connection with in-building communication applications. In FIG. 7, respective DC bias tees 70 and 72 are linked by an RF coaxial cable 74. The DC bias tee 70 is located adjacent the antenna system 20 and has respective RF and DC lines operatively coupled therewith. The second DC bias tee 72 is coupled to an RF input/output from a transmitter/receiver and to a suitable DC supply 48. The DC bias tees and DC supply operate in conjunction with the antenna system 20 and a remote transmitter/receiver (not shown) in much the same fashion as described hereinabove with reference to the system of FIG. 4.

In FIG. 8, the antenna system 20 receives an RF line from a fiber-RF transceiver 80 which is coupled through an optical fiber cable 82 to a second RF-fiber transceiver 84 which may be located remotely from the antenna and first transceiver 80. A DC supply or other power supply for the antenna may be located either remotely, as illustrated in FIG. 8 or adjacent the antenna system 20, if desired. The DC supply 48 is provided with a separate line operatively coupled to the antenna system 20, in much the same fashion as illustrated, for example, in the installation of FIG. 6.

What has been shown and described herein is a novel antenna array employing power amplifier chips or modules at the fees of individual array antenna elements, and novel installations utilizing such an antenna system.

While particular embodiments and applications of the present invention have been illustrated and described, it is to be understood that the invention is not limited to the precise construction and compositions disclosed herein and that various modifications, changes, and variations may be apparent from the foregoing descriptions, and are to be understood as forming a part of the invention insofar as they fall within the spirit and scope of the invention as defined in the appended claims.

What is claimed is:

1. An antenna system installation comprising a tower/support structure, and an antenna structure mounted on said tower/support structure, said antenna structure comprising:

a plurality of antenna elements;

a plurality of power amplifiers, each power amplifier being operatively coupled with one of said antenna elements and mounted closely adjacent to the associated antenna element, such that no appreciable power loss occurs between the power amplifier and the associated antenna element;

each said power amplifier comprising a relatively low power, relatively low cost per watt linear power amplifier chip;

a first RF transceiver and a power supply mounted on said tower/support structure and operatively coupled with said antenna structure; and a second RF transceiver structure mounted adjacent a base portion of said tower/support structure and coupled with said first RF transceiver by a coaxial cable.

2. An in-building antenna system installation comprising an antenna structure including:

a plurality of antenna elements, and a plurality of power amplifiers, each power amplifier being operatively coupled with one of said antenna elements and mounted closely adjacent to the associated antenna element, such that no appreciable power loss occurs between the power amplifier and the associated antenna element;

each said power amplifier comprising a relatively low power, relatively low cost per watt linear power amplifier chip, and a DC bias tee operatively coupled with said antenna structure; a coaxial line operatively coupled with said DC bias tee and running to a second DC bias tee, said second DC bias tee being operatively coupled to a DC supply and an RF input/output from a transmitter/receiver.

3. The installation of claim 2 further including a power supply coupled to said antenna structure.

4. A method of installing an antenna system on a tower/support structure, said method comprising:

mounting a plurality of antenna elements arranged in an antenna array on said tower/support structure;

coupling a power amplifier comprising a relatively low power, relatively low cost per watt linear power amplifier chip with each of said antenna elements mounted closely adjacent to the associated antenna element, such that no appreciable power loss occurs between the power amplifier and the associated antenna element; and mounting a first RF transceiver and a power supply on said tower/support structure, and coupling said first RF transceiver and power supply with said antenna structure; and mounting a second RF transceiver structure adjacent a base portion of said tower/support structure, and coupling said second RF transceiver with said first RF transceiver by a coaxial cable.

5. A method of constructing an in-building antenna system installation comprising:

providing a plurality of antenna elements;

coupling a power amplifier comprising a relatively low power, relatively low cost per watt linear power amplifier chip with each of said antenna elements mounted closely adjacent to the associated antenna element, such that no appreciable power loss occurs between the power amplifier and the associated antenna element; and coupling a DC bias tee with said antenna elements, coupling a coaxial line between said DC bias tee and a second DC bias tee, and coupling said second DC bias tee to a DC supply and to an RF input/output from a transmitter/receiver.

6. A method of installing an antenna system on a tower/support structure, said method comprising:

mounting a plurality of antenna elements arranged in an antenna array on said tower/support structure;

coupling a power amplifier comprising a relatively low power, relatively low cost per watt linear power amplifier chip with each of said antenna elements mounted closely adjacent to the associated antenna element, such that no appreciable power loss occurs between the power amplifier and the associated antenna element; and mounting a first RF transceiver and a power supply on said tower/support structure, and coupling said first RF transceiver and power supply with said antenna structure; and mounting a second RF transceiver structure adjacent a base portion of said tower/support structure, and coupling said second RF transceiver with said first RF transceiver by a coaxial cable.

7. An antenna system installation comprising a tower/support structure, and an antenna structure mounted on said tower/support structure, said antenna structure comprising:

a plurality of antenna elements, a plurality of power amplifiers, each power amplifier being operatively coupled with one of said antenna elements and mounted closely adjacent to the associated antenna element, such that no appreciable power loss occurs between the power amplifier and the associated antenna element;

each said power amplifier comprising a relatively low power, relatively low cost per watt linear power amplifier chip;

a DC bias tee mounted on said tower/support structure and operatively coupled with said antenna structure; and a coaxial line operatively coupled with said DC bias tee and running to a ground-based second DC bias tee adjacent a base portion of said tower/support structure, said second DC bias tee being operatively coupled to a DC supply and an RF input/output from a transmitter/receiver.

8. A method of installing an antenna system on a tower/support structure, said method comprising:

mounting a plurality of antenna elements arranged in an antenna array on said tower/support structure;

coupling a power amplifier comprising a relatively low power, relatively low cost per watt linear power amplifier chip with each of said antenna elements mounted closely adjacent to the associated antenna element, such that no appreciable power loss occurs between the power amplifier and the associated antenna element;

mounting a DC bias tee on said tower/support structure and operatively coupling said DC bias tee with said antenna array; and running a coaxial line from said DC bias tee to a ground-based second DC bias tee adjacent a base portion of said tower/support structure, and coupling said second DC bias tee to a DC supply and an RF input/output from a transmitter/receiver.

9. An antenna system installation comprising a tower/support structure, and an antenna structure mounted on said tower/support structure, said antenna structure comprising:

a plurality of antenna elements;

a plurality of power amplifiers, each power amplifier being operatively coupled with one of said antenna elements and mounted closely adjacent to the associated antenna element, such that no appreciable power loss occurs between the power amplifier and the associated antenna element, each said power amplifier comprising a relatively low power, relatively low cost per watt linear power amplifier chip;

a first RF transceiver mounted on said tower/support structure and operatively coupled with said antenna structure; and a second RF transceiver structure mounted adjacent a base portion of said tower/support structure and coupled with said first RF transceiver by a coaxial cable.

10. A method of installing an antenna system on a tower/support structure, said method comprising:

mounting a plurality of antenna elements arranged in an antenna array on said tower/support structure;

coupling a power amplifier comprising a relatively low power, relatively low cost per watt linear power amplifier chip with each of said antenna elements mounted closely adjacent to the associated antenna element, such that no appreciable power loss occurs between the power amplifier and the associated antenna element; and mounting a first RF transceiver on said tower/support structure, and coupling said first RF transceiver with said antenna structure; and mounting a second RF transceiver structure adjacent a base portion of said tower/support structure, and coupling said second RF transceiver with said first RF transceiver by a coaxial cable.

11. A method of installing an antenna system on a tower/support structure, said method comprising:

mounting a plurality of antenna elements arranged in an antenna array on said tower/support structure;

coupling a power amplifier comprising a relatively low power, relatively low cost per watt linear power amplifier chip with each of said antenna elements mounted closely adjacent to the associated antenna element, such that no appreciable power loss occurs between the power amplifier and the associated antenna element, and mounting a first RF transceiver on said tower/support structure, and coupling said first RF transceiver with said antenna structure; and mounting a second RF transceiver structure adjacent a base portion of said tower/support structure, and coupling said second RF transceiver with said first RF transceiver by a coaxial cable.

12. A distributed antenna array, comprising:

a plurality of antenna elements; and a plurality of power amplifiers, each power amplifier being operatively coupled to drive a single one of said antenna elements and mounted closely adjacent to the associated antenna element, such that no appreciable power loss occurs between the power amplifier and the associated antenna element;

each said power amplifier comprising a relatively low power, relatively low cost per watt linear power amplifier chip.

13. The distributed antenna array of claim 12, wherein each antenna element includes a feed point, and wherein each power amplifier is located at the feed point for the associated antenna element.

* * * * *